United States Patent
Kelly et al.

(10) Patent No.: US 7,182,250 B2
(45) Date of Patent: Feb. 27, 2007

(54) COMPUTING DEVICE WITH AN EMBEDDED MICROPROCESSOR OR MICRO-CONTROLLER

(75) Inventors: Martin Sean Kelly, Cherry Hinton (GB); Simon Fisher, Bucks (GB); Martin Strauch, Cambs (GB); Steven James Wenham, Cambridge (GB)

(73) Assignee: Smart Card Solutions Limited (GB)

( * ) Notice: Subject to any disclaimer, the term of this patent is extended or adjusted under 35 U.S.C. 154(b) by 82 days.

(21) Appl. No.: 10/451,033

(22) PCT Filed: Dec. 19, 2001

(86) PCT No.: PCT/GB01/05664

§ 371 (c)(1),
(2), (4) Date: Nov. 6, 2003

(87) PCT Pub. No.: WO02/50608

PCT Pub. Date: Jun. 27, 2002

(65) Prior Publication Data

US 2004/0078798 A1    Apr. 22, 2004

(30) Foreign Application Priority Data

Dec. 19, 2000   (GB) .............................. 0030958.3

(51) Int. Cl.
   *G06F 17/00* (2006.01)
(52) U.S. Cl. .................. 235/375; 235/379; 709/220; 719/331
(58) Field of Classification Search ................ 235/487, 235/492, 375, 379; 719/331; 709/220, 223; 370/352, 401
See application file for complete search history.

(56) References Cited

U.S. PATENT DOCUMENTS

| | | | | |
|---|---|---|---|---|
| 6,481,632 B2 * | 11/2002 | Wentker et al. | ............. | 235/492 |
| 2005/0074018 A1 * | 4/2005 | Zintel et al. | ................ | 370/401 |
| 2005/0108736 A1 * | 5/2005 | Schwabe et al. | ............ | 719/331 |
| 2005/0232246 A1 * | 10/2005 | Dowling | ..................... | 370/352 |
| 2005/0240665 A1 * | 10/2005 | Gu et al. | .................... | 709/220 |

FOREIGN PATENT DOCUMENTS

WO     PCT/US99/25103       10/1999

OTHER PUBLICATIONS

"Open Card: Talking to Your Smart Card", by Dirk Husemann and Reto Hermann; Jul.-Sep. 1999; pp. 53-57.

* cited by examiner

*Primary Examiner*—Karl D. Frech
(74) *Attorney, Agent, or Firm*—Synnestvedt Lechner & Woodbridge LLP

(57) ABSTRACT

A computing device with an embedded microprocessor or micro-controller, including a software stack which comprises a content manager, and a runtime environment positioned in the stack above or together with a hardware abstraction layer. The content manager is not specific to any one design of runtime environment or hardware abstraction layer, so that several different designs of runtime environment and/or hardware abstraction layer can each operate with the same content manager. This de-couples the content manager from the runtime environment and/or hardware abstraction layer (e.g. a Java Virtual machine; elements of the operating system). The core advantage is that a single content manager can be used across multiple runtime environments and/or hardware abstraction layers; runtime environments and OSs can therefore be swapped without needing to re-write the content manager.

13 Claims, 5 Drawing Sheets

COMPUTING DEVICE WITH AN EMBEDDED MICROPROCESSOR OR MICRO-CONTROLLER

CROSS REFERENCE TO RELATED APPLICATIONS

This application claims the priority of PCT Application No. PCT/GB01/05664 filed on Dec. 19$^{th}$, 2001 and British application GB 0030958.3 filed on Dec. 19$^{th}$ 2000, the contents of both of which are hereby incorporated by reference.

BACKGROUND TO THE INVENTION

1. Field of the Invention

This invention relates to a computing device with an embedded microprocessor or micro-controller. A smart card is one implementation.

2. Description of the Prior Art

The use of embedded microprocessors and micro-controllers is widespread and increasing. Industrial appliances (vending machines, control machinery), automotive electronics (engine management systems, chassis electronics), communications devices (mobile telephones, private radio network systems) and personal computing devices (PDA's- personal digital assistants, smart cards) all use e embedded microprocessors or micro-controllers.

A specific example of an embedded micro-controller environment that benefits from the present invention is the smart card, typically a plastic credit-card shaped device containing an embedded, secure, micro-controller device. The use of smart cards as portable, secure, personalised computing devices is increasing. Historically, the functionality of a smart card has been fixed at the time of issuance. Recently, businesses have been exploiting techniques to modify the business logic and functionality of a smart card after it has been issued to a customer. Two main alternative techniques are proposed in the market today—the Visa originated Visa Open Platform (VOP) and MULTOS, a secure operating system owned by Mondex International. These techniques endeavour to provide a framework enabling the remote, cryptographically protected (secure and authenticated) modification of executable software (e.g. Java applets) within the smart card after it has been issued to a cardholder. VOP specifies a 'Card Manager application' held on a smart card that acts as the Card Issuer's on-card representative and provides secure application life cycle management functions. The Card Manager application defines, for example, how new applets/applications are loaded and installed onto a smart card; we will refer to this kind of functionality as 'content management' or, equivalently, 'life cycle content management' and the software which provides this as the 'content manager'. A content manager for a smart card therefore manages executable software over the entire life cycle of that software, including some or all of the following: loading, command routing, storing life cycle parameters, monitoring activities, crypto functionality via an API etc. Content managers for smart cards are becoming critically important The VOP Card Manager is itself an application that, in a typical implementation, runs on a Java Virtual Machine and is therefore executed via the JavaCard runtime environment. If the functionality of the Card Manager is to be hosted on a different operating system (i.e. one not running a Java Virtual Machine), then it must be rewritten as an application suitable for the new runtime environment. But the process of rewriting the Card Manager application is a complex and slow one, which must be performed with high regard for the correctness of the implementation of the critical security architecture. Developing a VOP application for, say, a Microsoft Windows-for-Smart Cards Card is a new process since it does not include a Java Virtual Machine; there is no re-use of the Java Card implementation's software.

MULTOS also features a mechanism for enablement and loading of executable software into the memory of the smart card. However, this is not implemented as an application on the runtime environment but as a low-level software routine that assumes certain features of the specific MULTOS run time environment. The drawback of this approach is that the load mechanism (i.e. loading and initialising new applets after the smart card has been issued) and run time environment are inextricably linked. For example, it is not possible to take this load mechanism and combine it with a different run time environment such as JavaCard.

The overwhelming bias in the prior art is therefore to tie the content manager to the runtime environment and/or hardware abstraction layer.

SUMMARY OF THE PRESENT INVENTION

In a first aspect of the invention, there is a computing device with an embedded microprocessor or micro-controller, in which a software stack comprises a content manager, and a runtime environment positioned in the stack above or together with a hardware abstraction layer;

wherein the content manager is not specific to any one design of runtime environment or hardware abstraction layer, so that several different designs of runtime environment and/or hardware abstraction layer can each operate with the same content manager.

Hence, the present invention de-couples the content manager from the runtime environment and/or hardware abstraction layer (e.g. where the runtime is the JavaCard Runtime Environment and the hardware abstraction layer is the Java Virtual machine). The core advantage is that a single content manager can be used across multiple runtime environments and/or hardware abstraction layers (e.g. JavaCard or SMOS); runtime environments and OSs can therefore be swapped without needing to re-write the content manager. This is very useful for smaller runtime environments, such as the EMV and PKI micro-applications, since a single content manager can provide the extensive feature set normally associated with a large OS. Further, because a single content manager is used across different runtime environments and/or hardware abstraction layers, it becomes economically justifiable to invest a degree of software effort in refining the content manager that would be impossible without a common code set.

In one implementation, the content manager resides below at least some of the hardware abstraction layer in the stack and sends and receives data via an interface which is not specific to any one design of runtime environment or hardware abstraction layer. The interface may enable the content manager and runtime environment to exchange at least one of the following commands:

(a) 'select', for informing the runtime environment that a new application has been selected and 'deselect' for informing the runtime environment that a current application has been deselected;

(b) 'process' for causing the runtime environment to process commands routed via the content manager and for causing the content manager to process a request on behalf of the runtime environment;

(c) 'defragment' for informing the runtime environment when the content manager moves blocks of memory, so that storage addresses can be altered; and (d) 'loading' announcing to the runtime environment that a new element of content has been loaded.

The content manager usually executes directly on the host microprocessor or micro-controller and not within or via the runtime environment, unlike a conventional content manager, which executes within or via the runtime environment.

Further, an applet can call the content manager via a thin wrapper in which the wrapper insulates the calling applet from needing to communicate directly with the content manager underneath the hardware abstraction layer.

The content manager can be implemented as a plug-in, such that its interfaces are defined in a way that allows the content manager to be exchanged for a second content manager with alternative procedural behaviour without the need to modify the supported runtime environment. The runtime environment may also be implemented as a plug-in. Further, multiple runtime environments can be present in the same device. The content manager may be written in a programming language specifically for the development of applications in a format which is readily portable across different microprocessors and/or microcontrollers, such as the Quarter language from Smart card Solutions Limited of Cambridge, England.

In a second aspect of the invention, there is a method of loading applets onto several computing devices with embedded system architectures, in which the same loading instructions can be used by devices with different runtime environments and/or hardware abstraction layers because each device is a device as described above.

BRIEF DESCRIPTION OF THE DRAWINGS

The invention will be described with reference to the accompanying drawings, in which.

DETAILED DESCRIPTION

Figure 1:
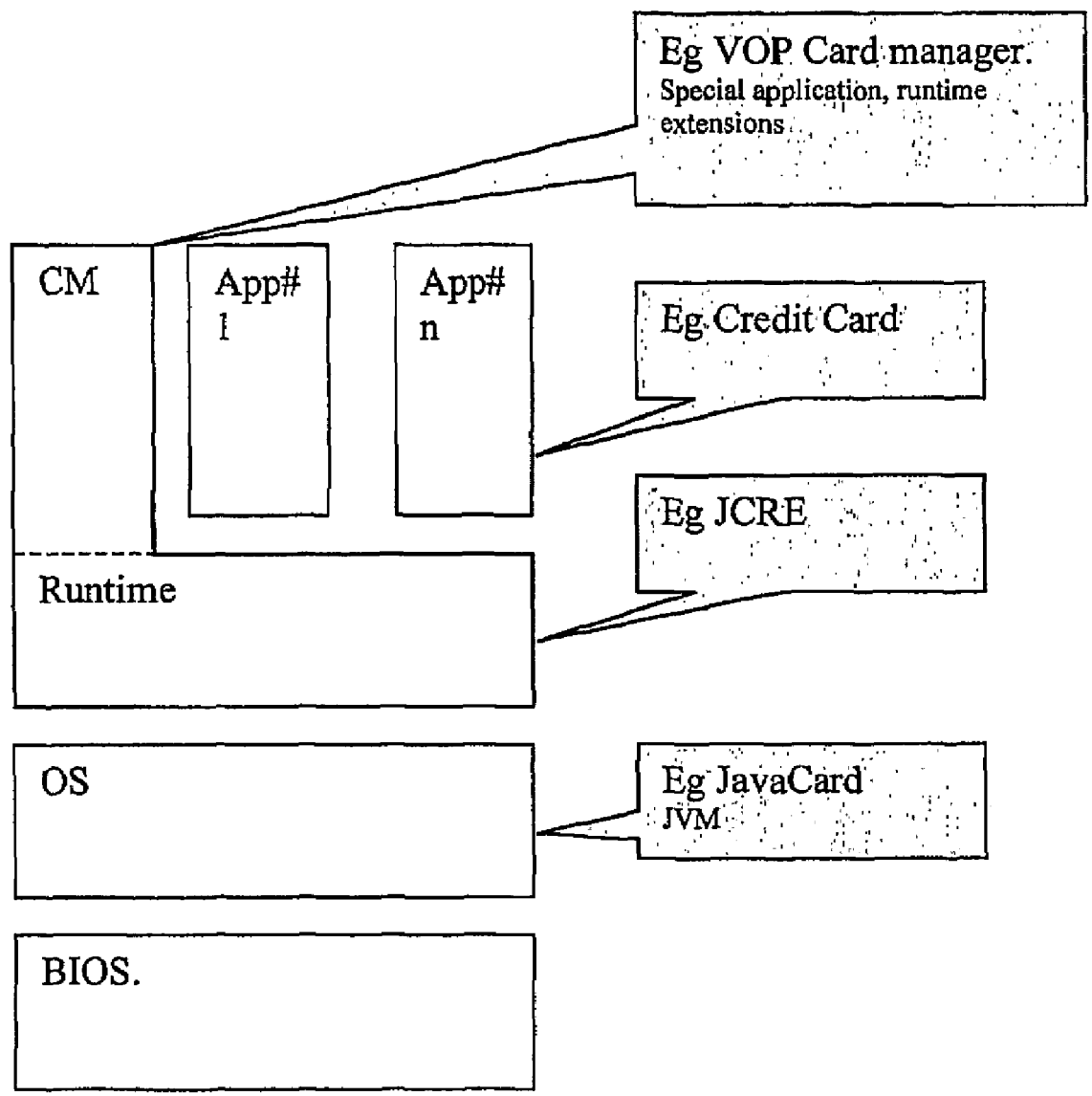
FIG. 1 shows the architecture of a traditional smart card.

An implementation of the present invention requires the encapsulation of the content management functionality as a component separate from the runtime environment. This means that it is possible to "plug in" any runtime environment meeting the requirements of the interface presented by the content manager. There is no need to develop a new variant of the content manager. Alternatively, it is possible to implement a variety of content management techniques for multiple operators, by plugging in different content managers, whilst retaining a consistent single runtime environment, which is of value where consistent runtime behaviour is a critical issue.

A significant advantage of this implementation of the invention is that it is possible for the content manager and the runtime environment to communicate via a simple, generic interface such that flexible operation is assured whilst maintaining the independence of the content manager and the runtime environment.

Further advantages flow:

Security

The security provided by the content life cycle management functionality is at the core of the smart card implementation, rather than being added on as an application or applet. In a conventional design, the content manager is an application at the top of the software stack; small modifications to the runtime environment can impact the content manager, so that testing and re-verification of security features is often needed for a conventional design when the supported runtime environment has been subject to even minor modifications. But in the present invention, the content manager is far lower down the stack and is de-coupled from the runtime environment. Hence, the content manager is insulated from changes to the runtime environment and the need to test and re-verify the content manager is much reduced.

Encapsulation

Each module provides specific functionality with a well-defined interface to the other modules (where appropriate). This separation of functionality allows for rapid development, a flexible implementation and the removal of the reliance of any module on the implementation of any other module.

Independence

The content life cycle management functionality is self contained and not dependent on the Runtime Environment. The interface between the content life cycle management functionality and the Runtime Environment is defined in a generic manner, allowing "plug-in" Runtime Environment's to be developed and integrated with the content life cycle management functionality as required. Likewise, plug-in content managers are also possible.

Flexibility

The approach to development provides flexibility in the development of both the runtime environment and the card content life cycle manager. There is no requirement to develop these components in conjunction with each other; all that is required is that they each meet the generic interface.

Reusability

All that is required to develop a different content life cycle management compliant operating system is a new Runtime Environment module. There is no requirement for any new content life cycle management development.

FIG. 1 shows a typical prior art smart card, in which the content manager (labelled CM) is tied to the Java Virtual Machine at the OS level of the stack. The CM, in this case the Visa Open Platform Card Manager, resides at the application level of the stack but executes on the JVM with special privileges. Because the CM executes on the JVM using Java bytecode, it can only be used with a JVM and not with any other kind of OS. This is a major disadvantage, since there are many other competing OSs which cannot therefore reuse a Java implementation of the VOP Card Manager.

Figure 2A:
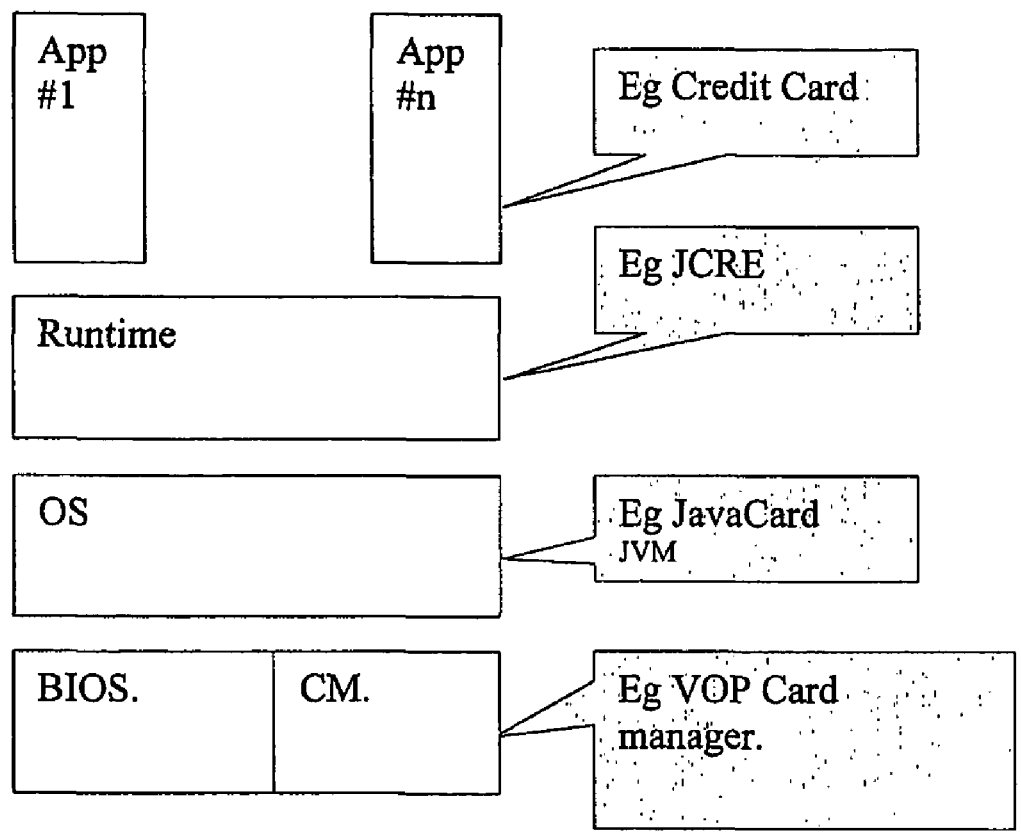
FIGS. 2A and 2B shows the architecture for a smart card as defined in the present invention.
Figure 2B:
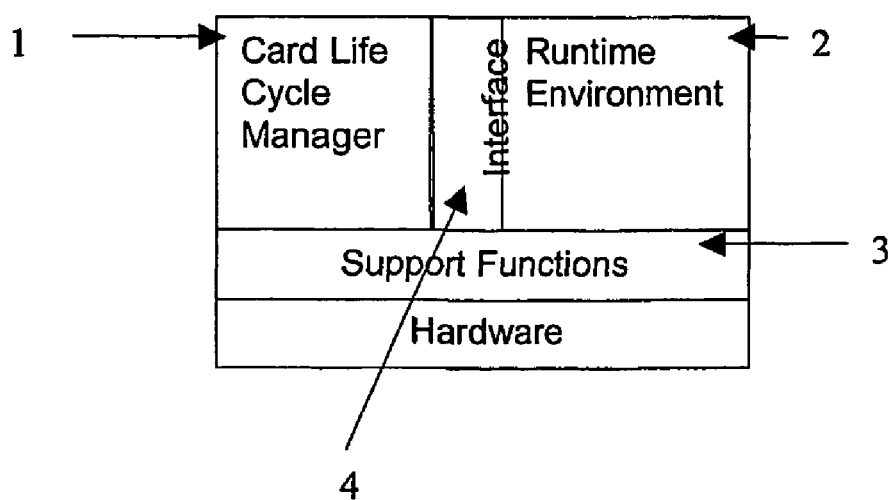

FIGS. 2A and 2B illustrates the arrangement of the present invention, which is based on the approach of encapsulating specific areas of functionality in separate components with minimal, generic interfaces. At the highest level, the system is separated into three basic components:

Content Life Cycle Manager (CLCM in FIG. 2B and CM in FIG. 2A) 1
Runtime Environment (RE) 2
Support Functions 3 (for both the Content Life Cycle Manager and the Runtime Environment).

In FIG. 2A, which shows the software stack on a smart card, the CM resides at the BIOS level below the operating system and runtime environment. Critically, it is independent of and de-coupled from the operating system and runtime environment and hence not tied to any particular type or design of operating system/runtime environment.

FIG. 2B is another representation of a smart card using the present invention, showing explicitly the interface 4 between the CLCM 1 and the RE 2.

The three major components in FIG. 2B are described in more detail below.

The content manager CLCM 1 provides all the functionality required to manage the life cycles of the loaded content. In particular, this may include some or all of the following:
  The commands required for loading content.
  Provision of the cryptographic infrastructure required for controlling content life cycles securely.
  Command routing (including smart card application selection).
  Storage of content life cycle parameters.
  Monitoring the activities of the loaded content.
  Providing cryptographic functionality, via an API, for the loaded content.

Note that this list is not definitive—one of the advantages of the approach described here is that it is possible to enhance functionality without affecting the other components.

The runtime environment RE 2 is the mechanism for executing the loaded applications using the code and data contained in the content. In general the RE 2 consists of a Virtual Machine (VM) that is responsible for checking and executing code, and the VM-specific support functions required to allow the VM to operate in a secure and correct manner. It may be noted that the region where a runtime environment ends and an operating system begins is not necessarily capable of precise articulation; boundaries can be arbitrary and subjective. Hence, we use the broader phrase "runtime environment positioned in the stack above or together with a hardware abstraction layer" to capture this inherent ambiguity.

The support functions provided by the runtime environment may include sub-components such as:
  The Package Access Module (PAM), which provides information to the VM about the location and boundaries of code and data.
  The Installer, which is responsible for formatting load packets (the content will normally be loaded as a sequence of packets) as they arrive, providing the PAM with the information it requires for the content being loaded.
  The Application Programming Interface (API) that is used by the VM to provide runtime functionality to the loaded content.

Note again that this list is not definitive—the separation of the RE 2 functionality from the CLCM 1 means that the make up of the RE 2 is not restricted by the implementation of the CLCM 1.

The Support Functions 3 provide the low level interface to the hardware. They may be used by both the CLCM 1 and the RE 2, but do not provide an interface between those two components.

The support functions may include the following:
  Memory management functions, including protected write mechanisms.
  Basic I/O functionality.
  Cryptographic functions.
  The boot processes required to be performed on power-up.

The Interface (4) between the CLCM 1 and the RE 2 is fundamental. It is designed to be minimal, providing maximum separation, and hence independence, of the CLCM 1 and RE 2. The interface consists only of the three methods required to perform the following:
  select and deselect: inform the RE 2 that a new application has been selected (and that the currently selected application is to be deselected) in order to set the correct context by which code execution and data access are constrained.
  process: this method is used to route commands through to the RE 2 so that they may be processed as required by the relevant RE 2 sub-components.
  defragment: this informs the runtime environment when the content manager moves blocks of memory, so that storage addresses can be altered Note that for all of these methods the RE 2 will perform its own specific processing. It is only the interface that remains constant: the functionality of the CLCM 1 and/or the RE 2 need not be the same in different implementations.

The applications are executed via the RE 2, though they depend on the CLCM 1 for life cycle management, for example:
  Loading
  Personalization
  Deletion.

The CLCM 1 may also provide functionality to the applications via its own application programming interface.

Figure 3:
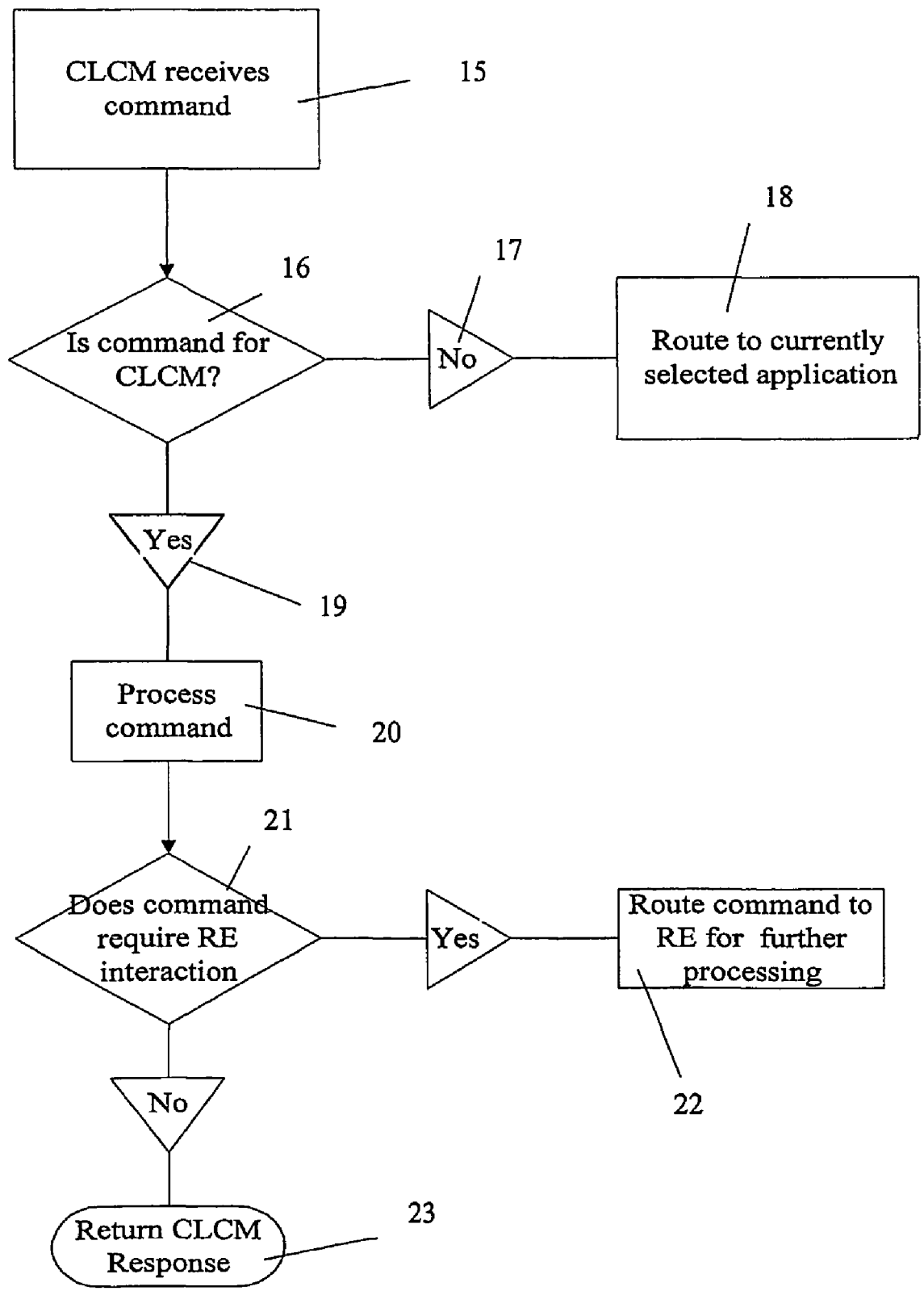
FIG. 3 shows a flowchart of one aspect of the operation of a smart card as defined in the present invention.

FIG. 3 shows a flowchart illustrating the processing of an input command in a possible embodiment of the method of the present invention.

The CLCM 1 is responsible 15 for processing every command, even if this is restricted to routing the command to another application, as depicted in steps 16, 17 and 18.

If the command impacts 21 on the RE 2 then the command is routed 22 to the RE 2 via the CLCM/RE interface 4. Note that this does not mean that the RE 2 will perform any processing in response to the command, only that it is given the opportunity to do so.

The types of command processed by the CLCM 1 that may impact on the RE 2 include (but are not restricted to) the following:
  Application selection—the CLCM 1 notifies the RE 2 via the select and deselect methods.
  Application loading commands—the CLCM 1 notifies the RE 2 of the fact that the application is being loaded and allows the RE 2 to perform any processing on the input data required to allow successful utilization of that data.

In practice the CLCM 1 and RE 2 may have to interact during the load process. This interaction is still managed via our minimal interface (select/deselect/process) but requires the RE 2 to provide service routines for the data being loaded. These routines will differ depending upon the RE 2 chosen. For example JavaCard needs to process each data block as loaded prior to storing whereas SMOS does not need to manipulate this data during the load. This invention caters for both scenarios by delegating the memory allocation and storage aspects of the load process to the RE 2.

Thus it is possible to separate the runtime environment from the administrative features of the content manager/card life cycle manager whilst enabling interaction between the two via a generic interface. This permits an efficient system management architecture and total re-use of card life cycle manager software whilst retaining maximum flexibility with regard to selection of runtime environment. Alternatively it enables the re-use of runtime environments and associated applications with a wide range of possible life cycle management approaches.

Whilst the specific embodiment described relates to a smart card, those skilled in the art will recognise that this technique is applicable to any system containing an embedded microprocessor or micro-controller, for example a personal computing device, mobile telephone, consumer appliance, automotive power-train or chassis electronics, vending machine or other industrial appliance, without departing from the scope of the invention. Any system where a secure method for modifying executable content in a broad base of systems utilising several run time environments will benefit from this invention.

Figure 4:
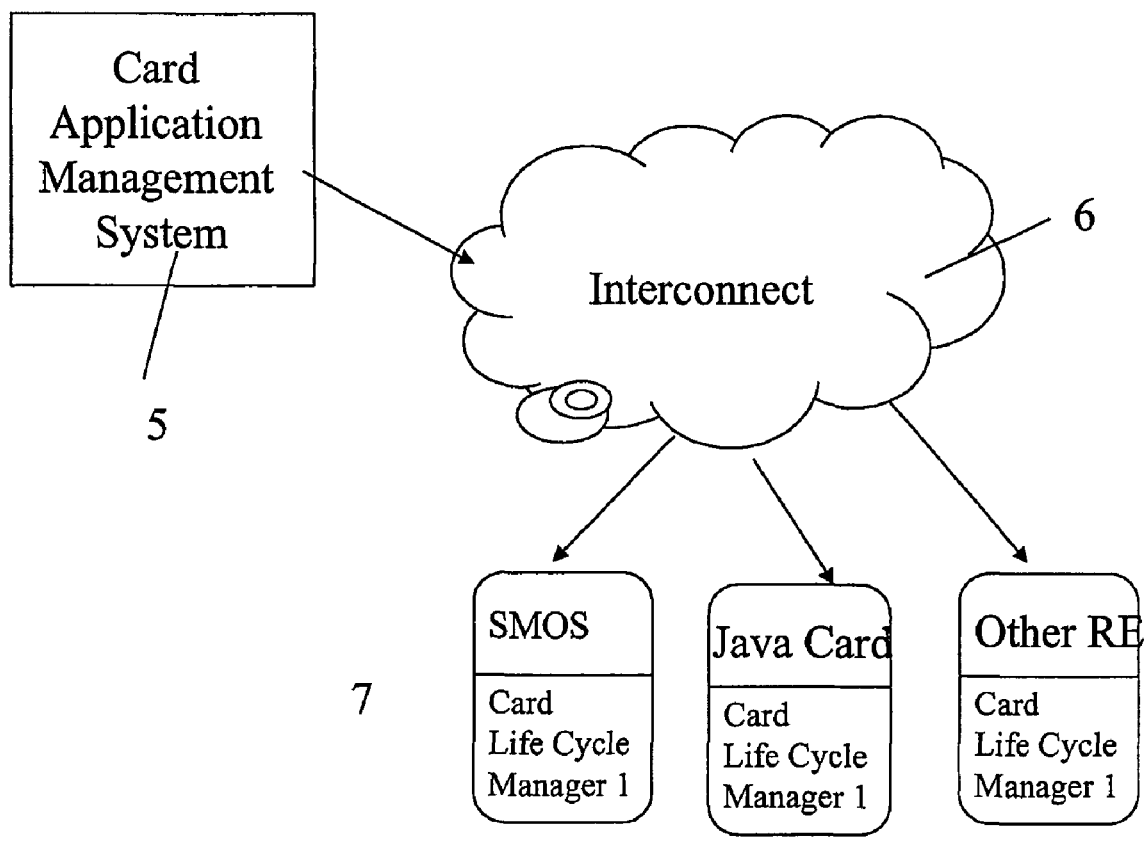
FIGS. 4 and 5 show multi-application smart card systems as defined in the present invention.

FIG. 4 shows a card management system 5 for managing executable content on a plurality of target smart cards 7. The interconnect 6 may be a simple terminal housed within a special facility adapted for the purpose or a remote connection via a public network such as the Internet or a mobile communications network, or a private network such as a banks' ATM network. The target smart cards 7 may comprise a variety of runtime environments but the content manager/content life cycle manager 1 in this implementation, remains the same in each and every card. With this structure, it is possible to configure a system that can provide the remote management of executable content whilst allowing the runtime environment to be changed without effect on the administrative policies or implementation of the content life cycle manager. The content life cycle manager implementation can be substantially or totally common across all instantiations of smart card, regardless of the run time environment.

Figure 5:
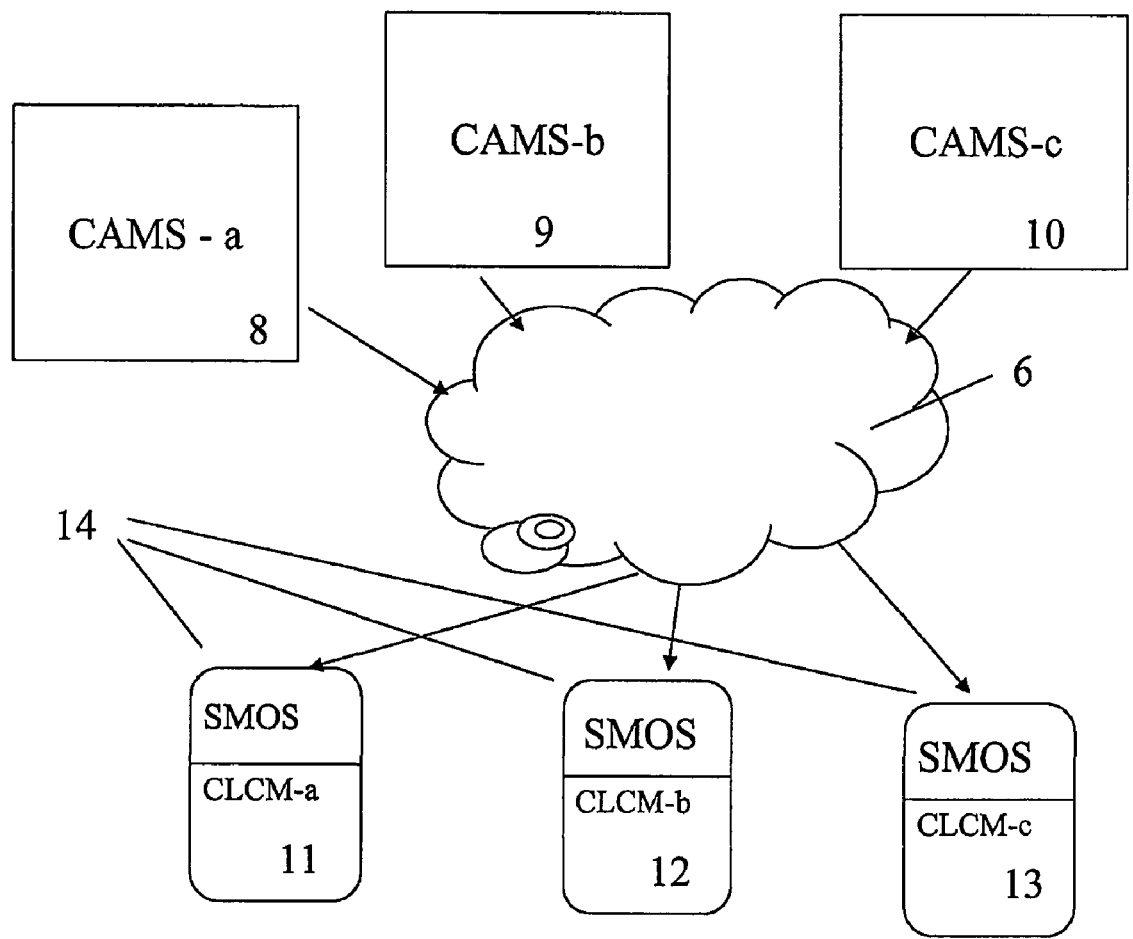

FIG. 5 shows a scenario where several smart cards 14 each comprise a SMOS runtime environment (SMOS was developed by Smart Card Solutions Ltd.) and individual content life cycle management functionality. The card comprising CLCM-a 11 is controlled and managed by a corresponding CAMS-a 8 (CAMS stands for Card Application Management Station). Similarly other cards 12, 13 are managed by corresponding management stations 9, 10. In this way a variety of operator needs for custom content lifecycle management are addressed whilst independently retaining and maintaining a common runtime environment.

The invention claimed is:

1. A computing device with an embedded microprocessor, in which a software stack comprises a content manager, programmed to manage one or more executable software applications over the lifecycle of said one or more software applications, including at least the loading of the or each application, and a runtime environment, wherein said content manager is located in said software stack below said runtime environment and is programmed to operate with a plurality of runtime environments, and to execute directly on the host microprocessor.

2. The computing device of claim 1 in which said content manager resides below at least some of said hardware abstraction layer in said stack and further including an interface capable of performing a data transfer between said content manager and said runtime environment such that said data transfer is operable with said plurality of runtime environments.

3. The computing device of claim 2 in which said data transfer is a command chosen from the group consisting of select, deselect, process, defragment and loading.

4. The computing device of claim 1 wherein said content manager executes directly on said embedded microprocessor.

5. The computing device of claim 1 further including an applet and a thin wrapper, such that said applet is capable of communicating with said content manager via said thin wrapper.

6. The computing device of claim 1 in which said hardware abstraction layer comprises a Java Virtual Machine and an operating system.

7. The computing device of claim 1 wherein said content manager is a first plug-in content manager having a first interface capable of operating with said runtime environment; and further including a second plug-in content manager having an alternative procedural behavior and a second interface capable of operating with said runtime environment, such that said first plug-in content manager and said second plug-in content manager can be exchanged.

8. The computing device of claim 1 in which said content manager is written in a programming language specifically for the development of applications in a format which is readily portable across different microprocessors.

9. The computing device of claim 1 in which said content manager can be used with a runtime environment chosen from the group consisting of a JavaCard runtime environment, a Small Machine Operation System (SMOS), a Europay Mastercard Visa (EMV) runtime environment and a Public Key Infrastructure (PKI) runtime environment.

10. The computing device of claim 1 in which said runtime environment is implemented as a plug-in.

11. The computing device of claim 1 comprising a plurality of runtime environments.

12. A method of loading an applet, comprising the steps of:
a) providing an embedded microprocessor, in which a software stack comprises a content manager programmed to manage one or more executable applets over the lifecycle of said one or more applets, including at least the loading of the or each applet; and a runtime environment, said content manager being located in said software stack below said runtime environment such that said content manager is programmed to operate with a plurality of runtime environments and to execute directly on the embedded microprocessor; and
b) loading said applet using a set of instructions, said instructions being operable with said plurality of runtime environments.

13. The method of claim 12 in which said content manager resides below at least some of said hardware abstraction layer in said stack and further including the step c) of providing an interface capable of performing a data transfer between said content manager and said runtime environment such that said data transfer is operable with said plurality of runtime environments.

* * * * *